(12) United States Patent
Isaacs et al.

(10) Patent No.: US 12,189,686 B2
(45) Date of Patent: *Jan. 7, 2025

(54) INTEGRATION OF VIDEO CONFERENCING APPLICATIONS WITH ON-DEMAND DATABASE SERVICES

(71) Applicant: Salesforce, Inc., San Francisco, CA (US)

(72) Inventors: Charles Hart Isaacs, Annapolis, MD (US); Vala Afshar, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,994

(22) Filed: Nov. 8, 2023

(65) Prior Publication Data
US 2024/0143652 A1 May 2, 2024

Related U.S. Application Data

(63) Continuation of application No. 17/002,454, filed on Aug. 25, 2020, now Pat. No. 11,847,165.

(51) Int. Cl.
*G06F 16/738* (2019.01)
*G06F 16/735* (2019.01)
(Continued)

(52) U.S. Cl.
CPC ........ *G06F 16/7837* (2019.01); *G06F 16/735* (2019.01); *G06F 16/738* (2019.01);
(Continued)

(58) Field of Classification Search
CPC .. G06F 16/735; G06F 16/738; G06F 16/7837; G06F 16/9536; H04N 5/272; H04N 5/445; H04N 7/15
See application file for complete search history.

(56) References Cited

U.S. PATENT DOCUMENTS 8,125,508 B2 2/2012 Kenoyer
9,185,342 B2 11/2015 Isaacs
(Continued)

FOREIGN PATENT DOCUMENTS

CA 3021361 C 9/2020
WO 2011136789 A1 11/2011
WO 2022046776 A1 3/2022

OTHER PUBLICATIONS

U.S. Appl. No. 17/002,454, Advisory Action mailed Mar. 22, 2023, 4 pgs.
(Continued)

*Primary Examiner* — James E Richardson
*Assistant Examiner* — Nirav K Khakhar
(74) *Attorney, Agent, or Firm* — Polygon IP, LLP

(57) ABSTRACT

A computing platform may be configurable to receive a request from a video conferencing application while a video conference is in session, the request including an indication of a selection of one or more participants in a video conference session. The computing platform may also be configurable to implement a query of a database system, the query being configured to retrieve user object data, and generate a result object based, at least in part, on the retrieved one or more user data objects, the result object being configured to display information about the at least one participant. The computing platform may be configurable to provide the result object to a client device to display a graphical user interface (GUI) window including the information about the at least one participant, the GUI window comprising a user interface element to provide access to at least one function associated with a computing platform.

20 Claims, 17 Drawing Sheets

(51) Int. Cl.
  *G06F 16/783* (2019.01)
  *G06F 16/9536* (2019.01)
  *H04N 5/272* (2006.01)
  *H04N 5/445* (2011.01)
  *H04N 7/15* (2006.01)

(52) U.S. Cl.
  CPC ......... *G06F 16/9536* (2019.01); *H04N 5/272* (2013.01); *H04N 5/445* (2013.01); *H04N 7/15* (2013.01)

(56) References Cited

U.S. PATENT DOCUMENTS

| | | | |
|---|---|---|---|
| 9,444,857 | B2 | 9/2016 | Isaacs |
| 9,626,523 | B2 | 4/2017 | Isaacs et al. |
| 9,992,242 | B2 | 6/2018 | Isaacs |
| 10,089,638 | B2 | 10/2018 | Rohde et al. |
| 10,296,717 | B2 | 5/2019 | Isaacs |
| 10,313,476 | B2 | 6/2019 | Isaacs et al. |
| 10,715,459 | B2 | 7/2020 | Isaacs |
| 2014/0118474 | A1 | 5/2014 | Fluhr et al. |
| 2015/0201162 | A1 | 7/2015 | Griffin et al. |
| 2017/0237787 | A1 | 8/2017 | Schulz et al. |
| 2018/0365713 | A1 | 12/2018 | Rohde et al. |
| 2019/0354428 | A1 | 11/2019 | Sur et al. |
| 2022/0067092 | A1 | 3/2022 | Isaacs et al. |

OTHER PUBLICATIONS

U.S. Appl. No. 17/002,454, Final Office Action mailed Dec. 19, 2022, 15 pgs.
U.S. Appl. No. 17/002,454, Non Final Office Action mailed Jun. 23, 2022, 11 pgs.
U.S. Appl. No. 17/002,454, Non Final Office Action mailed Apr. 19, 2023, 16 pgs.
U.S. Appl. No. 17/002,454, Notice of Allowance mailed Aug. 9, 2023, 8 ps.
Int'l Application Serial No. PCT/US21/47360, Search Report and Written Opinion mailed Nov. 17, 2021.

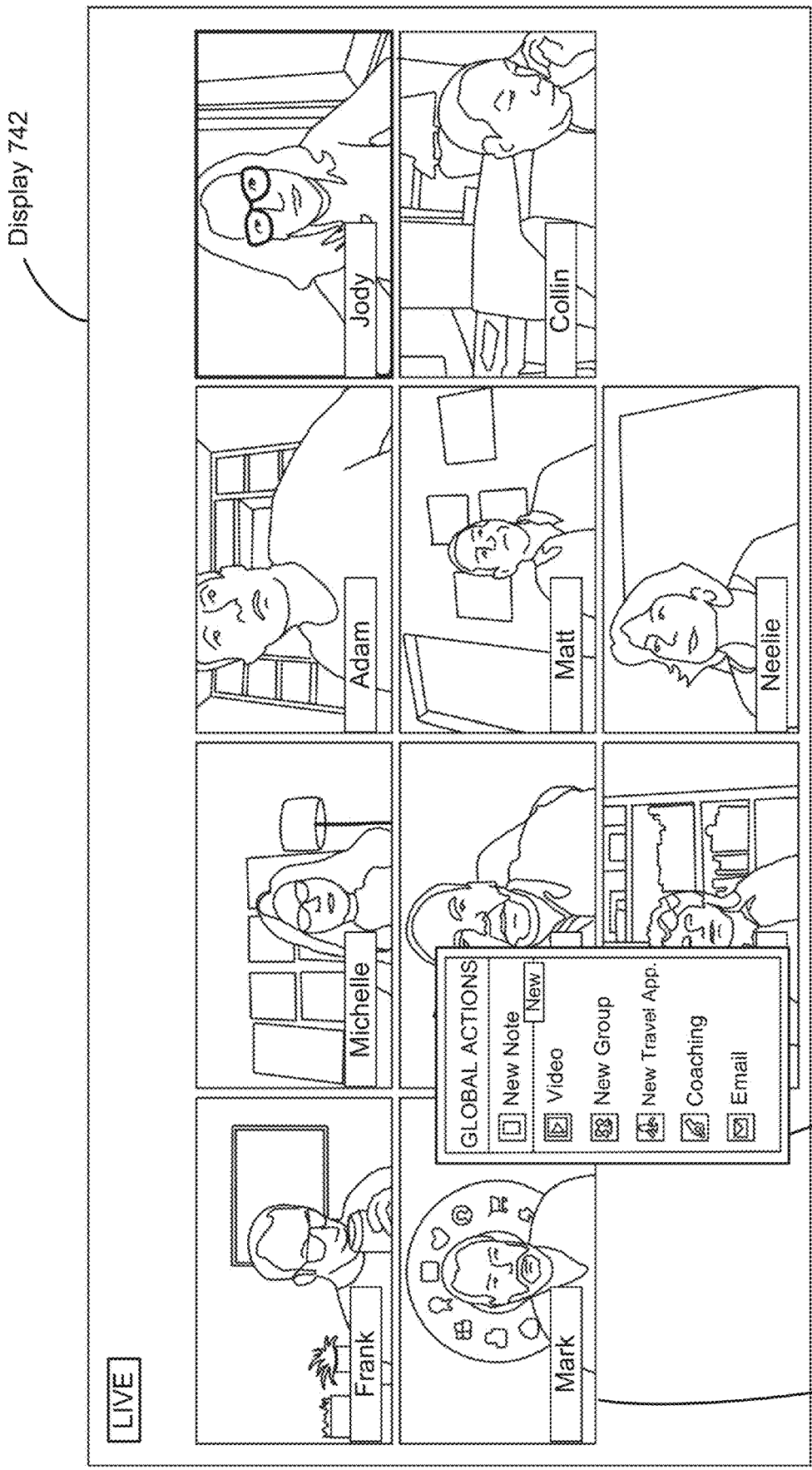

INTEGRATION OF VIDEO CONFERENCING APPLICATIONS WITH ON-DEMAND DATABASE SERVICES

CROSS-REFERENCE TO RELATED APPLICATIONS

This application is a Continuation of U.S. patent application Ser. No. 17/002,454, filed Aug. 25, 2020, which is incorporated by reference herein in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to video conferencing applications, and more specifically to integration of computing platforms and on-demand database services with such video conferencing applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Additional services provide users with the ability to engage in group communications modalities, such as video conferences, in which groups of users are provided with both video and audio connectivity. Such video conferencing services may be implemented by hosting applications on servers, such as application servers. Accordingly, groups of users may engage in video conference sessions by using video conferencing applications hosted by application servers.

BRIEF DESCRIPTION OF THE DRAWINGS

The included drawings are for illustrative purposes and serve only to provide examples of possible structures and operations for the disclosed inventive systems, apparatus, methods and computer program products for integrating of video conferencing applications and on-demand database services. These drawings in no way limit any changes in form and detail that may be made by one skilled in the art without departing from the spirit and scope of the disclosed implementations.

FIGS. 7A-7H illustrate examples of a displays associated with video conferencing applications, implemented in accordance with one or more embodiments.

DETAILED DESCRIPTION

Figure 1:
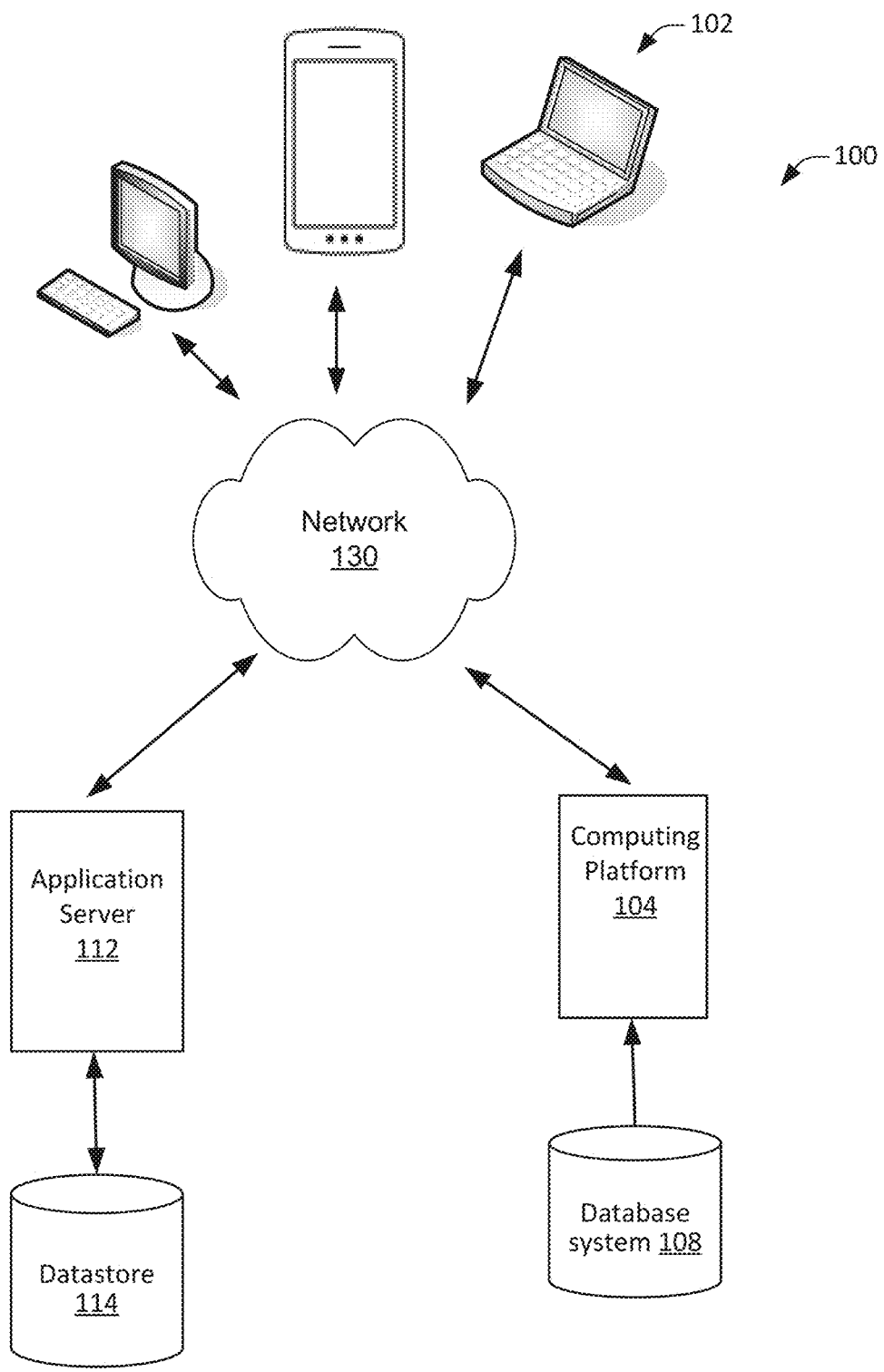
FIG. 1 illustrates an example of an arrangement of components in a video conferencing and database system, configured in accordance with one or more embodiments.

On-demand computing platforms may be used to host applications that can be used by numerous users in a distributed manner across various geographical locations. Accordingly, in such computing platforms, utilization of the application is provided to the users by one or more servers accessible over the Internet rather than installing software locally on in-house computer systems. In this way, the application is provided to the user via a web-based interface, and execution of the application as well as storage of associated files and data is implemented using a distributed or cloud-based computing infrastructure.

Some web-based applications enable the implementation of video conference sessions in which various users may be provided with a communications environment that enables video and audio communication between the users. For example, a video conferencing application may provide various windows for different participants of the video conference session, and each window may include a video stream for a particular participant. In this way, the participants may be provided with a unified view of visual and audio feeds of each other, thus allowing them to communicate.

Various embodiments disclosed herein provide the ability to integrate data and functionality provided by an on-demand computing platform with an implementation of a video conferencing application. As will be discussed in greater detail below, the video conferencing application may be implemented separately from the on-demand computing platform, and an interface may be provided between the two to enable the integration of data from the on-demand computing platform into the session of the video conferencing application. In this way, embodiments disclosed herein enable the dynamic identification, retrieval, and integration of data from the on-demand computing platform into a session of the video conferencing application. As will also be discussed in greater detail below, such data may include various data associated with participants of the video conference session, such as customer relationship management (CRM) data, as well as data from other applications supported by the on-demand computing platform.

In one example, a user may have initiated a video conference session of a video conferencing application. Accordingly, the video conference session may have multiple participants, and each participant may have a display window for display of video information as well as other associated information, such as a name or title. In various embodiments, the user may provide an input to the video conferencing application, such as a mouse click or a hover, and the video conferencing application may generate a request based on such an input. The request may be sent to the on-demand computing platform via an application interface. The on-demand computing platform may then query a database system operated and maintained by the on-demand computing platform. Such a database system may be used by the on-demand computing platform to store various user data, such as CRM data associated with various users. In various embodiments, user parameters associated with at least one participant of the video conference session may be used to execute the query, and the results may be retrieved and sent back to the video conferencing application as a result object via the application interface. The video conferencing application may then display at least some of the result object as a new user interface element that is integrated with a display of the video conference session. In this way, a display of the video conference session may be augmented to display data retrieved from the on-demand computing platform, as well as provide additional actions and functionalities supported by the on-demand computing platform.

FIG. 1 illustrates an example of an arrangement of components in a video conferencing and database system, configured in accordance with one or more embodiments. As will be discussed in greater detail below, a system, such as system 100, may be configured to support one or more web applications and/or cloud services, such as a video conferencing application. Moreover, system 100 may be configured to provide coupling between such a video conferencing application and a computing platform to enable the augmentation of data available to and displayed by the video conferencing application. In this way, additional user data may be retrieved from various other heterogeneous data sources, and integrated with the implementation of the web application, which may be a video conferencing application.

Accordingly, system 100 includes various client machines, which may also be referred to herein as client devices, such as client machine 102. In various embodiments, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various embodiments, client machine 102 is configured to execute one or more applications that may utilize a user interface. Accordingly, a user may request and view various different display screens associated with such applications via client machine 102. In various embodiments, a user interface may be used to present the display screen to the user, as well as receive one or more inputs from the user.

In some embodiments, the user interface may utilize a web browser executed on client machine 102 or may be a standalone locally executed application. As will be discussed in greater detail below, the application may be a web-based application that is hosted by an application provider.

Accordingly, system 100 further includes one or more application servers, such as application server 112, and various client devices may be communicatively coupled to application server 112. In various embodiments, application server 112 is configured to include software and hardware that provides an environment for the execution of an application. As will be discussed in greater detail below, application server 112 may include one or more processors and memory configured in such a manner. Accordingly, application server 112 may be configured to store program code and settings for a particular application, and may also be configured to execute the code. Moreover, application server 112 may be in communication with numerous client devices, and may implement the application in a distributed manner. In some embodiments, application server 112 is further configured to generate and serve webpages that may be viewed by a user via one or more devices, such as client machine 102. Accordingly, application server 112 is configured to provide a web-based interface between a user of client machine 102 and an application that is deployed in a distributed environment.

In one example, the application may be a video conferencing application that is configured to provide audio and video connectivity between various users that may be using client machines. Accordingly, the video conferencing application may be configured to initiate and support video conference sessions in which a group of users, also referred to herein as participants, may participate in a video conference. It will be appreciated that the video conferencing application may support other functionalities as well, such as chat or messaging. In various embodiments, and as will be discussed in greater detail below, the video conferencing application may also be configured to include an application interface that is configured to couple with one or more other entities, such as computing platform 104 discussed in greater detail below. In some embodiments, application server 112 is coupled to datastore 114 which may be configured to store data associated with webpages served by application server 112, and may provide local storage for application server 112.

System 100 additionally includes computing platform 104. As shown in FIG. 1, computing platform may also be coupled to database system 108. As discussed in greater detail below with reference to at least FIG. 8, computing platform 104 is configured to host one or more distributed on-demand applications. Moreover, computing platform 104 may also include an interface configured to handle function calls, also referred to herein as server calls, generated by application server 112. The interface may be implemented using components of a database system, such as an application program interface (API), discussed in greater detail below with respect to FIG. 8. Accordingly, various user data may be stored and maintained by components of computing platform 104. As also shown in FIG. 1, computing platform 104 is coupled to database system 108, which is configured to provide data storage utilized by computing platform 104. As will be discussed in greater detail below, database system 108 may be configured as a multi-tenant database system that provides storage of various user data for users for various different entities, such as subscribers of services provided by computing platform 104. In one example, the data stored in database system 108 may be social network data retrieved from one or more social networks such as Facebook and LinkedIn®.

It will be appreciated that the data stored in database system 108 may include additional types of information as well, such as weather data, geographical data, news data or other data from a knowledge database, emergency or health services data, or any other suitable type of information maintained by an on-demand database service provider. The data stored in database system 108 may also be CRM data maintained by an on-demand database service provider, such as Salesforce.com®, and generated based, at least in part, on one or more services or products provided by the on-demand database service provider. Accordingly, database system 108 includes system data storage and a tenant database, as discussed in greater detail below with reference to FIG. 8. In various embodiments, computing platform 104 is also coupled to communications network 130, and is communicatively coupled to application server 112 and client machine 102.

Figure 2:
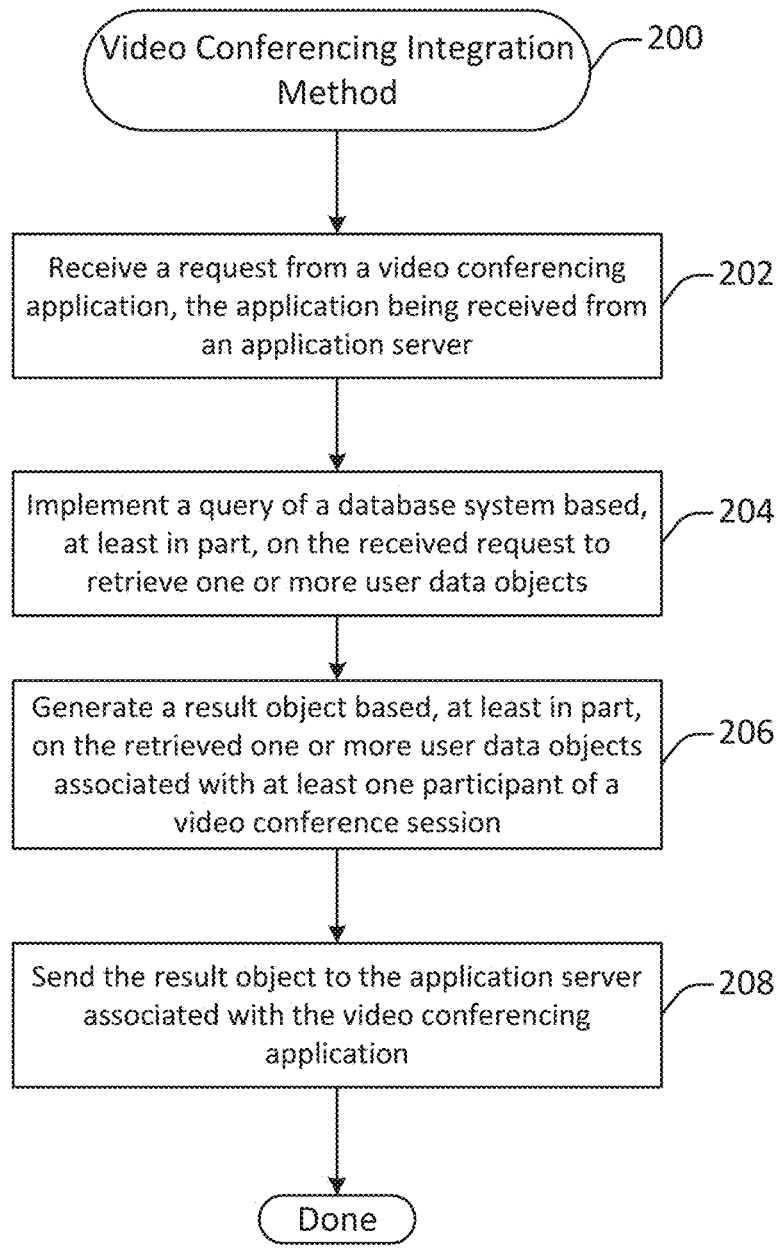
FIG. 2 illustrates an example of a method for video conferencing application integration, performed in accordance with one or more embodiments.

FIG. 2 illustrates an example of a method for video conferencing application integration, performed in accordance with one or more embodiments. As similarly discussed above, web applications and/or cloud services, such as a video conferencing application, may be coupled with a computing platform to enable the augmentation of data available to and displayed by the video conferencing application. As will be discussed in greater detail below, a method, such as method 200, may be implemented to integrate such additional data with a particular session of the web application, and in a manner that may be implemented dynamically.

Accordingly, method 200 may commence with operation 202 during which a request may be received from a video conferencing application. In some embodiments, the request may be received from an application server at a computing platform. As discussed above, the applications server may be used to implement a particular application, such as a video conferencing application. Moreover, the execution of the application may include the creation and initiation of an application session, such as a video conference session. In various embodiments, during the video conference session, the application server may receive and input from a user via a client device, and the application server may determine that additional information should be retrieved for the application session. Accordingly, the application server may generate and send a request to a computing platform.

Method 200 may proceed to operation 204 during which a query of a database system may be implemented based, at least in part, on the received request. Accordingly, in response to receiving the request, one or more components of the computing platform may implement a query to retrieve data associated with the request. For example, a query may be implemented of a database system. More specifically, user data associated with the request may be queried. In various embodiments, one or more user data objects may be identified and retrieved as a result of the query.

Method 200 may proceed to operation 206 during which a result object may be generated based, at least in part, on the retrieved one or more user data objects. Accordingly, the result object may be a data object that is generated to include the retrieved user data, and in accordance with a format that is compatible with the application hosted by the application server. In various embodiments, the user data includes one or more user data objects that may be associated with at least one participant of the video conference session. Accordingly, the user data may be specific to particular participants of the application session.

Method 200 may proceed to operation 208 during which the result object may be sent to the application server associated with the video conferencing application. Accordingly, the result object may be sent from the computing platform and received by the application server. The application server may then integrate the user data included in the result object in accordance with the application supported by the application server. As will be discussed in greater detail below, the application server may, for example, utilize the additional user data to augment a display associated with a video conferencing application.

Figure 3:
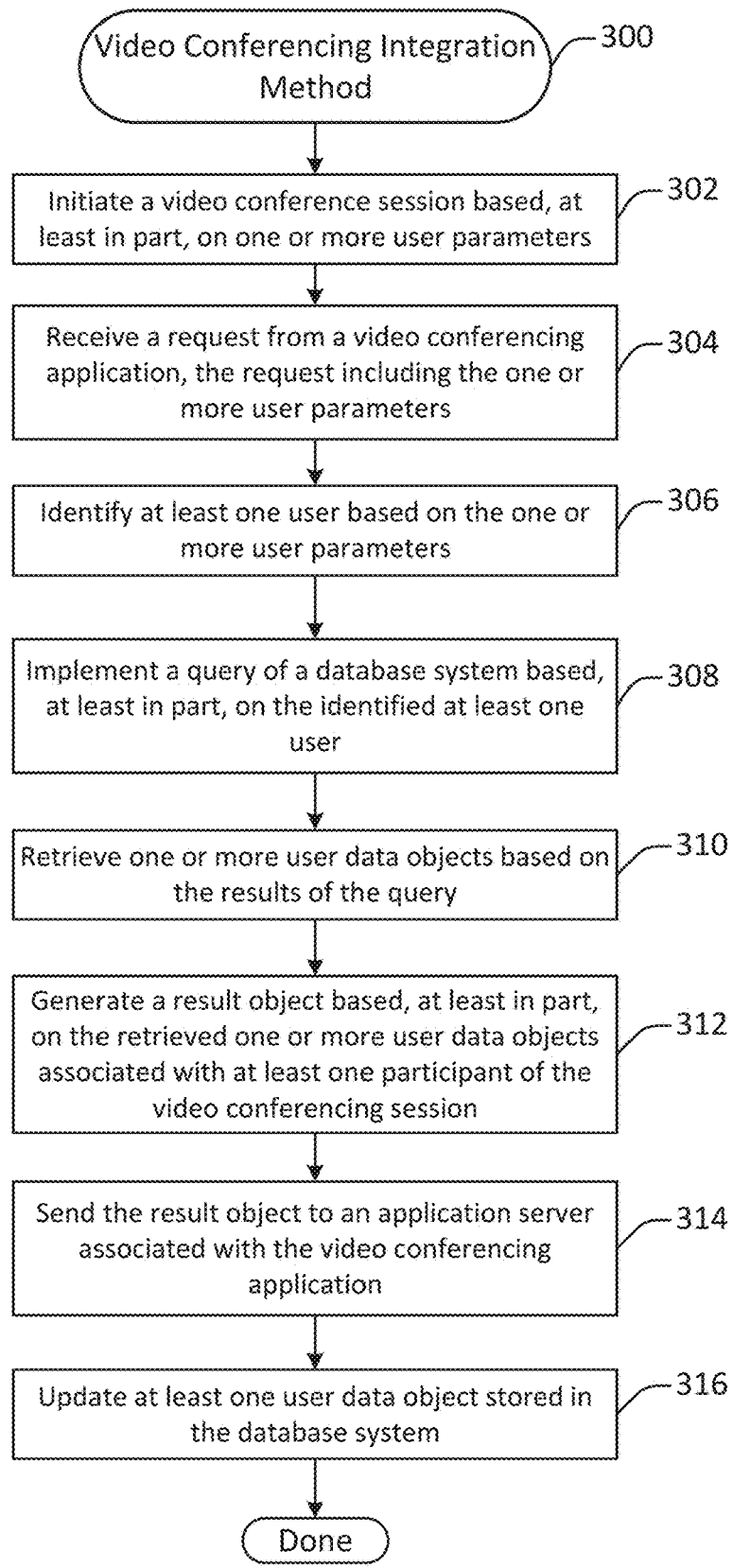
FIG. 3 illustrates another example of a method for video conferencing application integration, performed in accordance with one or more embodiments.

FIG. 3 illustrates another example of a method for video conferencing application integration, performed in accordance with one or more embodiments. As similarly discussed above, web applications and/or cloud services may be coupled with a computing platform to enable the augmentation of data available to and displayed by the video conferencing application. As will be discussed in greater detail below, a method, such as method 300, may be implemented to identify and integrate specific user data objects from a database system of a computing platform while a session of the application is running.

Accordingly, method 300 may commence with operation 302 during which a video conference session may be initiated based, at least in part, on one or more user parameters. As discussed above, a video conference session may have various users that are participants in the video conference. Accordingly, such participants may be identified based on one or more unique identifiers, such as user identifiers. The participants may also be identified based on other data, such as a user name or a client device. During operation 302, a particular user, such as a host of the video conference, may initiate a video conference session by, for example, clicking a link and sending a request to the application server. The application server may initiate the video conference session in response to receiving the request as well as, in some embodiments, other authentication information. The video conference session may be configured to display participant information based on user parameters which may include identifying information such as user identifiers.

Method 300 may proceed to operation 304 during which a request may be received from the video conferencing application. In various embodiments, the request includes at least some of the one or more user parameters. As similarly discussed above, the request may be received from the application server at a computing platform. In one example, the request may be generated by the application server in response to receiving an input from a client device of a participant in the video conference session. More specifically, the participant may have provided an input using an input device, such as a click or a hover over one of the other participant's windows, the click or hover may be identified as an input, and may trigger the generation and sending of a request by the application server.

In various embodiments, the request may be received via an interface, such as an API, between the application server and the computing platform. Accordingly, the request may be used to generate a custom object that defines a list of API calls specific to types of data objects native to the computing platform. More specifically, the custom object may configure API calls associated with the request based on a structure of such native data objects. In this way, particular data fields of the native data objects, such as location, preferences, social media handle, may be targeted by the request. In various embodiments, aspects of the custom objects, such as aspects of the list of API calls, may be customized and defined by an entity, such as an administrator or a user.

Method 300 may proceed to operation 306 during which at least one user may be identified based on one or more user parameters included in the request. Accordingly, the request may be received at the computing platform, and data values included in the request may be parsed to identify the one or more participants identified by the request and based on the user input. In some embodiments, the identifiers associated with the participants may be mapped from a first set of identifiers to a second set of identifiers. For example, the identifiers included in the request may be used by the application server, and they may be mapped to a set of identifiers used by a database system maintained by the computing platform. Such a mapping may be implemented based on an identifier mapping stored in the computing platform and generated based on a previous account configuration and previous interactions between the application server and the computing platform.

Method 300 may proceed to operation 308 during which a query of a database system may be implemented based, at least in part, on the identified at least one user. Accordingly, in response to identifying the at least on user, one or more components of the computing platform may implement a query to retrieve available data associated with the identified at least one user. For example, during operation 308, a query may be executed on one or more data tables of the database system that may be used to store user profile data for various users as well as other data, such as CRM data and social network data obtained from a plurality of different data sources.

While various embodiments are disclosed with reference to a query of the database system associated with a computing platform, additional implementations are also contemplated and disclosed herein. For example, the computing platform may utilize another application interface to another system to query and retrieve additional data responsive to the identification of the user or receiving of a request, as will also be discussed in greater detail below. In this way, embodiments disclosed herein may be implemented with any external system that has an available API. Accordingly, the computing platform may utilize an API to query another system during operation 308. Moreover, the connection to the other system may be customized and configured by an entity, such as an administrator, to specifically identify and retrieve data based on the identified user. In various embodiments, such additional systems may be weather databases associated with weather reporting, or geographical databases associated with geolocation and mapping services. In this way, a hover over a user may trigger the identification of that user, and the initiation of a query for weather data for the user's location.

Method 300 may proceed to operation 310 during which one or more user data objects may be retrieved based on the results of the query. Accordingly, specific user data may be identified and retrieved for the at least one user. More specifically, particular types of user data, such as social network data from a particular social network, may be identified based on one or more designated parameters, and may be retrieved as part of the result of the query. In various embodiments, such designated parameters may have been previously specified by an entity, such as a user or administrator. In this way, the particular data retrieved from the computing platform may be configurable. As discussed above, the user data may be stored in one or more user data objects that are identified and retrieved as a result of the query.

Method 300 may proceed to operation 312 during which a result object may be generated based, at least in part, on the retrieved one or more user data objects. As similarly discussed above, the result object may be a data object that is generated to include the retrieved user data, and in accordance with a format that is compatible with the application hosted by the application server. As also noted above, the user data includes one or more user data objects that may be associated with at least one participant of the video conference session. Accordingly, during operation 312, a result object may be generated that includes user data specific to each participant of the application session that was identified by the request.

Method 300 may proceed to operation 314 during which the result object may be sent to the application server associated with the video conferencing application. As similarly discussed above, the result object may be sent from the computing platform, and may be received by the application server. The application server may then integrate the user data included in the result object in accordance with the application supported by the application server. For example, the application server may utilize the additional user data to update a display associated with a video conferencing application, and dynamically display user data retrieved from the computing platform in the display of the video conferencing application.

Method 300 may proceed to operation 316 during which at least one user object may be updated. In various embodiments, the at least one user object is stored in the database system as part of the user's profile. Accordingly, a user's profile data may be updated to log an event or store a logfile that identifies that such a query was implemented, and for which user data. In this way, the user's data in the database system may be updated to log requests associated with the web conferencing application.

Figure 4:
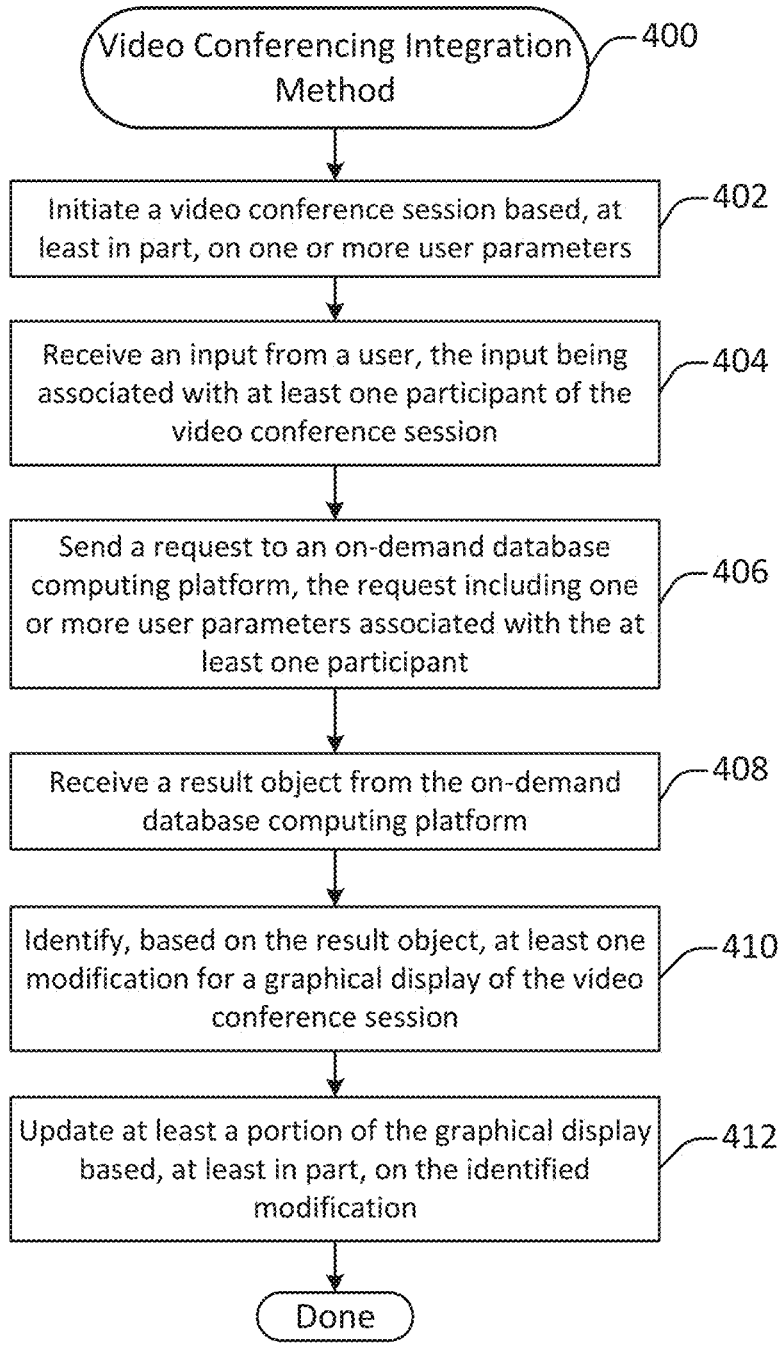
FIG. 4 illustrates an example of a method for updating a graphical display associated with a video conferencing application, performed in accordance with one or more embodiments.

FIG. 4 illustrates an example of a method for updating a graphical display associated with a video conferencing application, performed in accordance with one or more embodiments. As similarly discussed above, web applications and/or cloud services may be coupled with a computing platform to enable the augmentation of data available to and displayed by the video conferencing application. As will be discussed in greater detail below, a method, such as method 400, may be implemented to update a graphical display of the video conferencing application while a session of the application is running.

Accordingly, method 400 may commence with operation 402 during which a video conference session may be initiated based, at least in part, on one or more user parameters. As discussed above, a video conference session may have various users that are participants in the video conference, and such participants may be identified based on one or more unique identifiers, such as user identifiers. Accordingly, during operation 402, a particular user, such as a host of the video conference, may initiate a video conference session by, for example, clicking a link and sending a request to the application server. The application server may initiate the video conference session in response to receiving the request as well as, in some embodiments, other authentication information.

Method 400 may proceed to operation 404 during which an input may be received from a user. In some embodiments, the input may be received during the video conference session that was initiated during operation 402. As discussed above, the implementation of the video conference session may include the generation and display of a graphical user interface that displays various windows for the participants of the video conference session. Such windows may each display a video stream as well as visual indicators for each participant. Such visual indicators may be features such as a name, badge, and or other graphical elements, such as highlighting of the window. Additional details of such windows are discussed in greater detail below with reference to FIGS. 7A-7G. In various embodiments, the participant may provide an input using an input device, such as a mouse, a keyboard, or a touchscreen, and the input may be a click or a hover over one of the other participant's windows. Accordingly, during operation 404, an input may be identified based on an input event, such as a click or hover, relative to one or more graphical user interface elements of the web conferencing application.

Method 400 may proceed to operation 406 during which a request may be sent to a computing platform. As similarly discussed above, the request may include one or more user parameters that are associated with at least one participant of the video conference session. Accordingly, the request includes at least some of the one or more user parameters. Moreover, the request may be received at a computing platform that utilizes the one or more user parameters to implement a query of a database system and identify and retrieve user data, as discussed above.

As also discussed above, the request may be sent to any external system having an available API. Accordingly, one or more other systems may be sent a request during operation 408. For example, a database system of a weather system may be queried based on the one or more user parameters. In another example, a database system of a news service or other publication may be queried based on the one or more user parameters. Moreover, the selection of the external system that is queried as well as the connection implemented via an API may be customized and configured by an entity, such as an administrator or a user. In this way, one or more requests may be issued as custom API calls implemented to one or more external database systems.

Method 400 may proceed to operation 408 during which a result object may be received from the computing platform. As similarly discussed above, the result object may be a data object that is generated to include the user data identified and retrieved responsive to the request. As also noted above, the user data includes one or more user data objects that may be associated with at least one participant of the video conference session. Accordingly, during operation 408, the result object may be received via an application interface at the application server.

Method 400 may proceed to operation 410 during which at least one modification may be identified for the graphical display of the video conferencing application. In various embodiments, the at least one modification may be a particular type of update or change to the graphical user interface of the web conferencing application, and the at least one modification may be identified based, at least in part, on the data included in the result object. For example, the at least one modification may be identified based on the type of input that was originally received at operation 404. More specifically, the input may have been a hover detected over a participant's window, and the identified at least one modification may be the generation of a pop-up window. In another example, the input may have been a click detected at a graphical user interface element, and the identified at least one modification may be the application of a color-coding scheme to the display windows. In various embodiments, the identification of a modification based on an input may be determined based on a designated mapping of inputs to modifications that may have been previously configured. The at least one modification may be further identified based on the contents of the result object which may be used to determine, for example, what user data should be displayed in the pop-up window.

Method 400 may proceed to operation 412 during which at least a portion of the graphical display may be updated based, at least in part, on the identified modification. As discussed above, such identified modifications may include the generation of new windows, pop-up windows, or the application of custom color schemes and/or visual configurations of graphical user interface elements of the web conferencing application. In one example, one or more graphical user interface elements may be updated to display the retrieved user data objects as an additional dynamically generated graphical user interface element overlaid on the existing graphical user interface of the web conferencing application. In such an example, the dynamically generated graphical user interface element may be a pop-up window displaying various social network data associated with a participant. In this way, during operation 412, the at least one modification identified during operation 410 may be implemented to update the graphical user interface to integrate the user data retrieved from the computing platform with the data displayed in the user interface of the video conferencing application.

Figure 5:
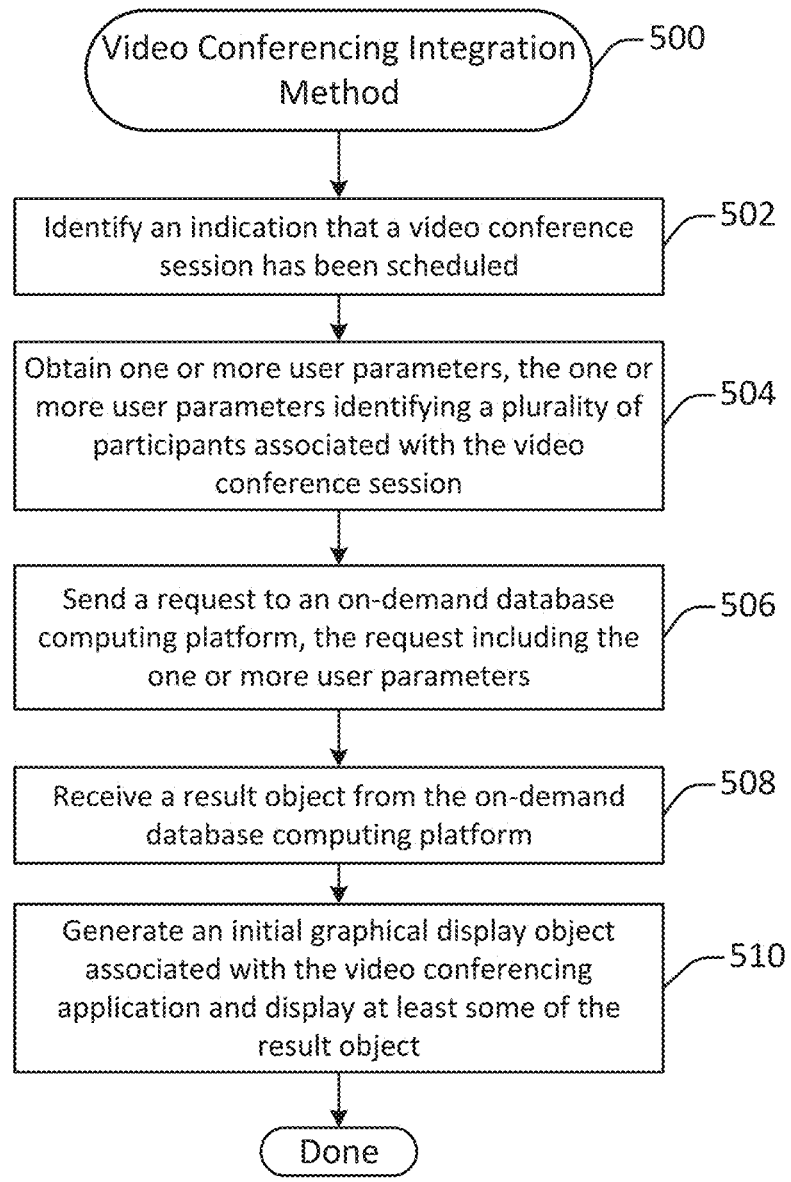
FIG. 5 illustrates an example of a method for generating an initial display object associated with a video conferencing application, performed in accordance with one or more embodiments.

FIG. 5 illustrates an example of a method for generating an initial display object associated with a video conferencing application, performed in accordance with one or more embodiments. As similarly discussed above, web applications and/or cloud services may be coupled with a computing platform to enable the augmentation of data available to and displayed by the video conferencing application. As will be discussed in greater detail below, a method, such as method 500, may be implemented to generate an initial graphical display object for a video conferencing application prior to the implementation of a session of the application.

Accordingly, method 500 may commence with operation 502 during which an indication that a video conference session has been scheduled may be identified. In various embodiments, such an indication may be received at the video conferencing application itself if the video conference session is scheduled via an interface of the video conferencing application. In some embodiments, the indication may be the sending or receiving of an email message, or the scheduling of a calendar event in a scheduling application. Accordingly, the indication that a video conference session has been scheduled may be received from a separate application, such as a scheduling assistant or other productivity tool.

Method 500 may proceed to operation 504 during which one or more user parameters may be obtained. As discussed above, a video conference session may have various users that are participants in the video conference, and such participants may be identified based on one or more unique identifiers, such as user identifiers. Accordingly, the one or more user parameters may include user identifiers for all participants that have been invited to join the video conference session, as may be identified based on the initial scheduling of the video conference session or parsed from a notification, such as an email message.

Method 500 may proceed to operation 506 during which a request may be sent to a computing platform. As similarly discussed above, the request may include one or more user parameters that are associated with at least one participant of the video conference session. Accordingly, during operation 506, the request may include the user parameters identified during operation 504, and user data may be requested for one or more of the identified participants of the video conference session. Moreover, the request may be received at a computing platform that utilizes the one or more user parameters to implement a query of a database system and identify and retrieve user data, as discussed above.

Method 500 may proceed to operation 508 during which a result object may be received from the computing platform. As similarly discussed above, the result object may be a data object that is generated to include the user data identified and retrieved responsive to the request. As also noted above, the user data includes one or more user data objects associated with the identified participants of the video conference session. Accordingly, during operation 508, the result object may be received via an application interface at the application server.

Method 500 may proceed to operation 510 during which an initial graphical display object may be generated. In various embodiments, the initial graphical display object is a display object that may be a display screen configured to be presented to a user prior to initiation of the video conference session. For example, the initial graphical display object may be presented to the user as a new display window or a pop-up window. In another example, the initial graphical display object may be integrated with the video conferencing application as a new graphical user interface element that is displayed prior to commencement of the video conference call. When configured in this manner, the initial graphical display object may provide a "briefing room" for the user prior to the actual commencement of the video conference call. As similarly discussed above, the initial graphical display object is configured to display data retrieved from the computing platform, such as social network data and CRM data. Thus, according to some embodiments, the initial graphical display object is configured to display at least some of the result object. In this way, the user may be presented with augmented information retrieved from various data sources of a computing platform prior to initiation of the video conference session, an in a customized display window viewable by the user.

Figure 6:
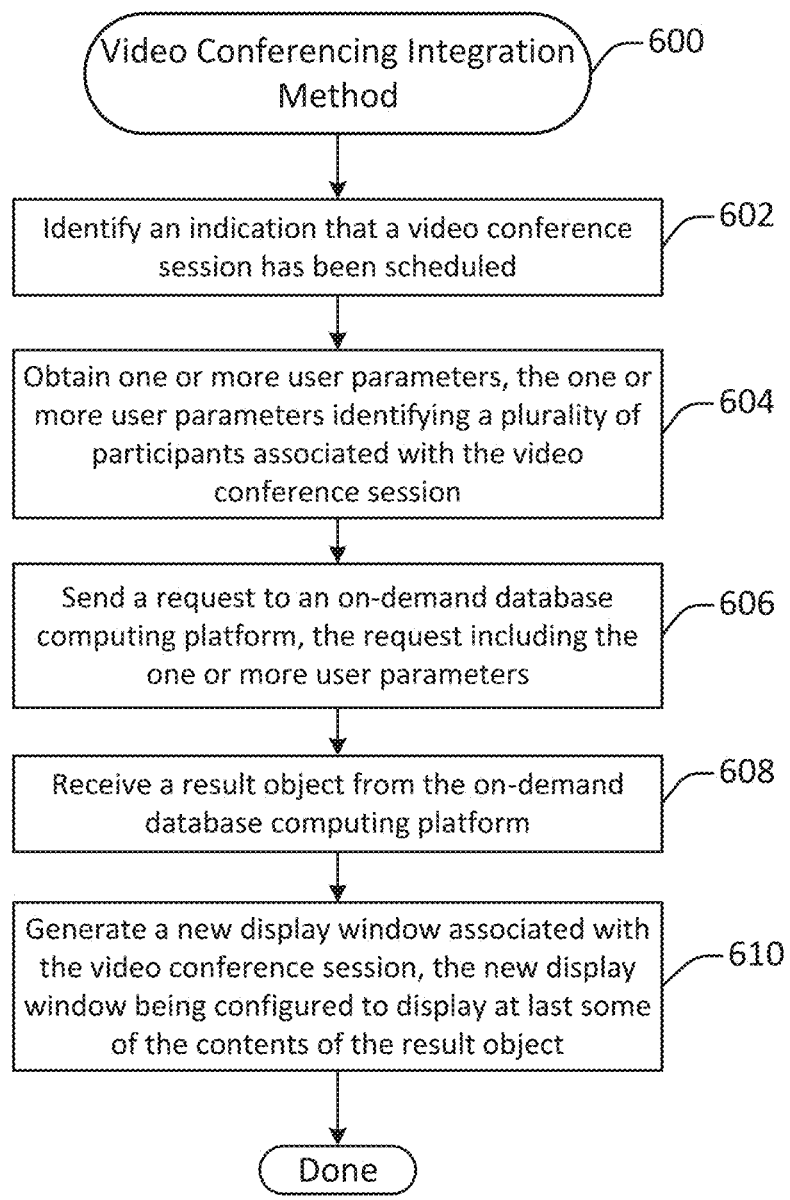
FIG. 6 illustrates an example of a method for generating an additional display object associated with a video conferencing application, performed in accordance with one or more embodiments.

FIG. 6 illustrates an example of a method for generating an additional display object associated with a video conferencing application, performed in accordance with one or more embodiments. As similarly discussed above, web applications and/or cloud services may be coupled with a computing platform to enable the augmentation of data available to and displayed by the video conferencing application. As will be discussed in greater detail below, a method, such as method 600, may be implemented to generate a new display window for the video conferencing application. As will also be discussed in greater detail below, such a new window may be generated dynamically and while a session of the application is running.

Accordingly, method 600 may commence with operation 602 during which a video conference session may be identified. In some embodiments, the video conference session may be identified based on an indication that a video conference session has been scheduled may be identified. As discussed above, such an indication may be received at the video conferencing application itself, or may be parsed from activity associated with another application, such as the sending or receiving of an email message, or the scheduling of a calendar event in a scheduling application. In various embodiments, the video conference session may be identified based on a video conference session that has already commenced. Accordingly, operation 602 may occur prior to or during the identified video conference session.

Method 600 may proceed to operation 604 during which one or more user parameters may be obtained. As discussed above, a video conference session may have various users that are participants in the video conference, and such participants may be identified based on one or more unique identifiers, such as user identifiers. Accordingly, as also discussed above, the one or more user parameters may include user identifiers for all participants that have been invited to join the video conference session, as may be identified based on the initial scheduling of the video conference session or parsed from a notification, such as an email message. In some embodiments, the one or more user parameters may be identified based on current participants of the video conference session if the video conference session has already commenced.

Method 600 may proceed to operation 606 during which a request may be sent to a computing platform. As similarly discussed above, the request may include one or more user parameters that are associated with at least one participant of the video conference session. Accordingly, during operation 606, the request may include the user parameters identified during operation 604, and user data may be requested for one or more of the identified participants of the video conference session. Moreover, the request may be received at a computing platform that utilizes the one or more user parameters to implement a query of a database system and identify and retrieve user data, as discussed above. As noted above, such a request may be generated in advance of a video conference session or during the video conference session.

Method 600 may proceed to operation 608 during which a result object may be received from the computing platform. As similarly discussed above, the result object may be a data object that is generated to include the user data identified and retrieved responsive to the request. As also noted above, the user data includes one or more user data objects associated with the identified participants of the video conference session. Accordingly, during operation 608, the result object may be received via an application interface at the application server.

Method 600 may proceed to operation 610 during which a new display window may be generated for the video conference session. Thus, according to some embodiments, a new display window may be generated and displayed to the user in a separate window than the video conferencing application. The new display window may be configured to display data retrieved from the computing platform, such as social network data and CRM data. Accordingly, the new display window is configured to display at least some of the contents of the result object. Furthermore, the new display window may also be configured to implement one or more functions or operations on such data to enable communication with the computing platform and updating of the stored data. Thus, the new display window may be a new application window that is configured as a custom portal that supports custom functions having associated access parameters for the implementation of security operations if appropriate. In some embodiments, the new display window is configured to support customized API calls. For example, a list of custom API calls may be specified by an entity, such as an administrator, and may be implemented to generate, at least in part, the new display window. In this way, an administrator may customize the API calls implemented by the new display window, as well as aspects of the API calls themselves. In various embodiments, such functions and operations may be enabled after the user completes one or more authentication operations. In this way, the new display window may be configured to support features and functions that are not otherwise available in the video conferencing application.

Figure 7A:
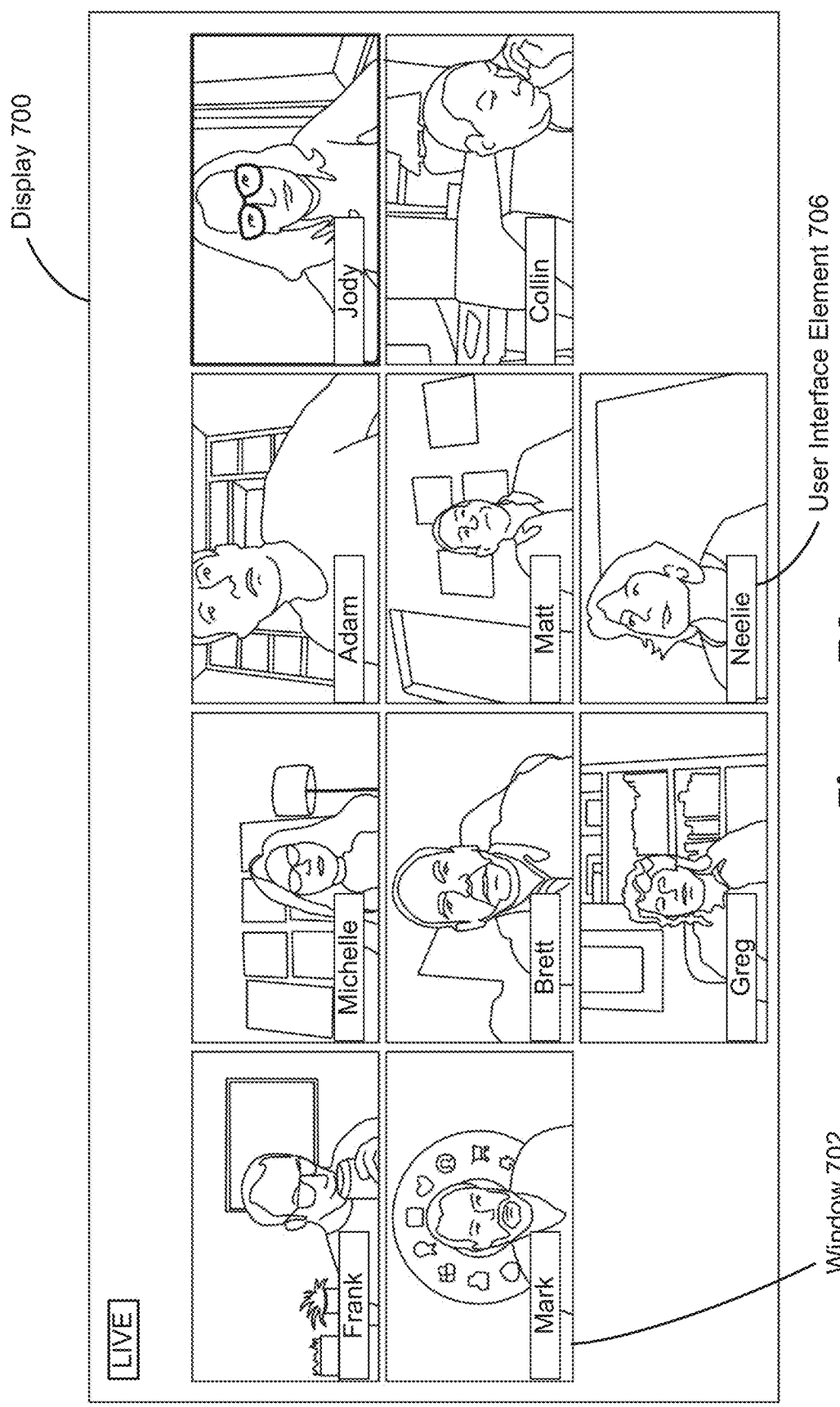

FIGS. 7A-7G illustrate examples of a displays associated with video conferencing applications, implemented in accordance with one or more embodiments. For example, FIG. 7A illustrates a diagram of an example of a display associated with a video conferencing application, configured in accordance with some embodiments. As shown in FIG. 7A, a video conferencing application may generate a display, such as display 700, which may include multiple windows, such as window 702, that are configured to display video streams for participants in a video conference session. Moreover, such display windows may include one or more user interface elements, such as user interface element 706, that are configured to display various information about the participants, such as a name. Moreover, as shown in FIG. 7A, aspects of the display windows may be modified to convey additional information. For example, window 702 is highlighted to convey the participant associated with window 702 is currently speaking.

Figure 7B:
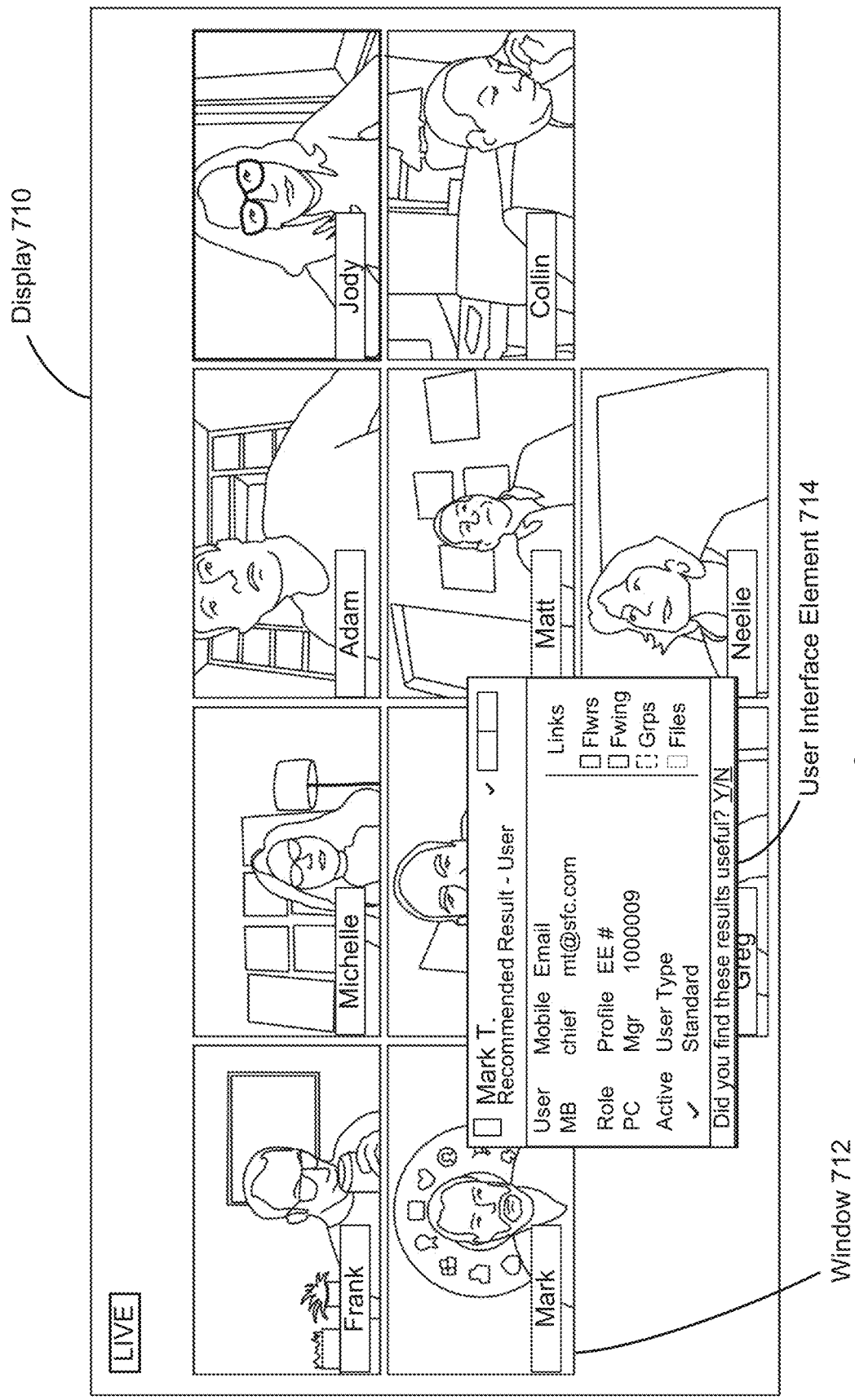

FIG. 7B illustrates a diagram of an example of a display associated with a video conferencing application, configured in accordance with some embodiments. As similarly discussed above, FIG. 7B illustrates a video conferencing application that may generate a display, such as display 710, which may include multiple windows, such as window 712, that are configured to display video streams for participants in a video conference session. As shown in FIG. 7B, additional user interface element 714 may be generated and overlaid on top of display 710 to convey information retrieved from a computing platform. In this example, the participant viewing display 710 may have provided an input, such as a hover over window 712, a request may have been generated and sent to the computing platform, and a result object may have been received and used to generate additional user interface element 714. Accordingly, additional user interface element 714 displays additional biographical and contextual data about the participant associated with window 712. As shown in FIG. 7B, such additional data may be contact information retrieved from a database system of the computing platform, and may also include hyperlinks to various social network pages or websites of the participant.

Figure 7C:
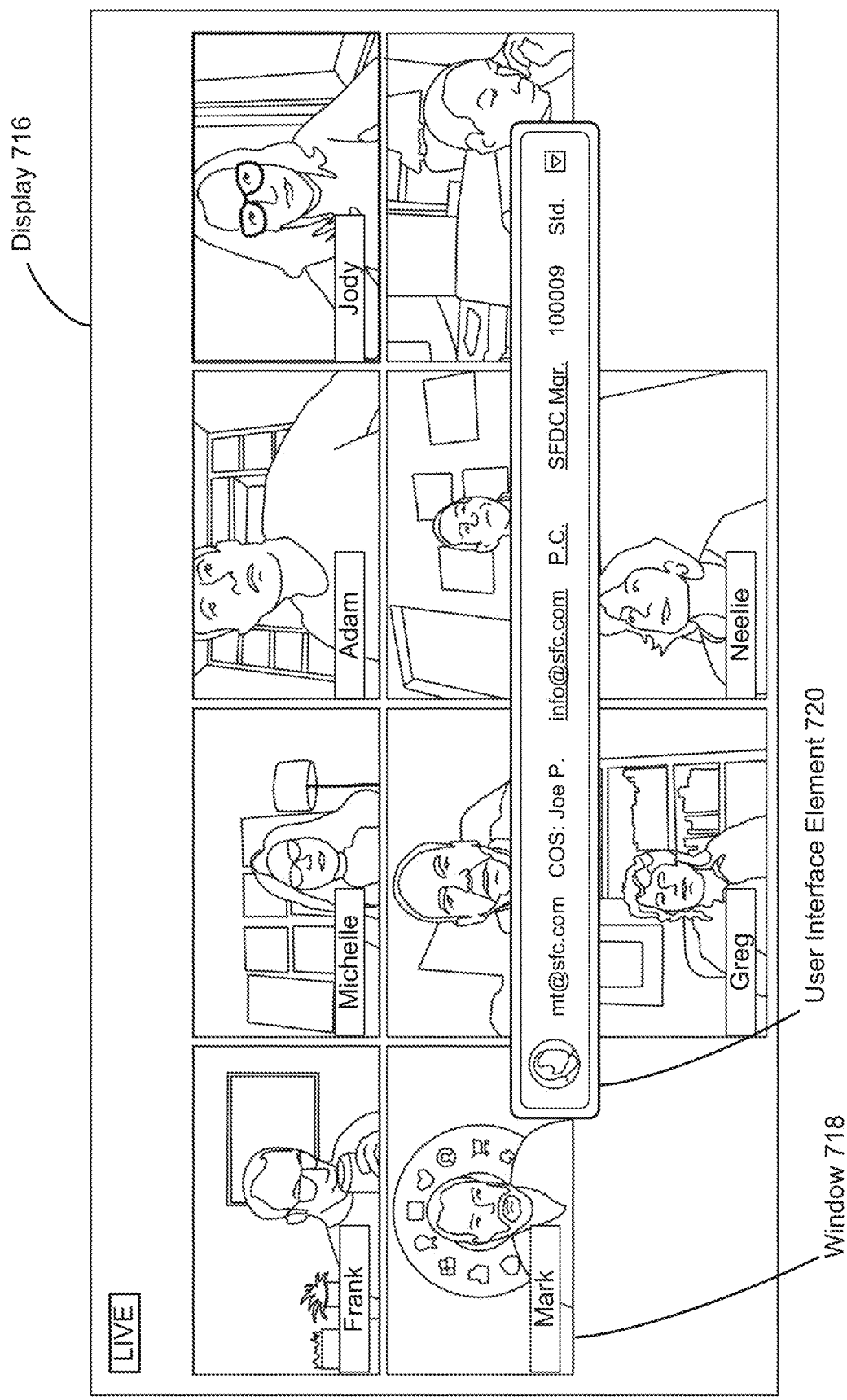

FIG. 7C illustrates a diagram of an example of a display associated with a video conferencing application, configured in accordance with some embodiments. As similarly discussed above, FIG. 7C illustrates a video conferencing application that may generate a display, such as display 716, which may include multiple windows, such as window 718, that are configured to display video streams for participants in a video conference session. As similarly discussed above, additional user interface element 720 may be generated and overlaid on top of display 716 to convey information retrieved from a computing platform. As similarly discussed above, additional user interface element 720 may be configured to display additional biographical and contextual data about the participant associated with window 718. In this example, the display of such information has been limited to just the contact information, and no social network information is displayed. In some embodiments, the configuration of additional user interface element 720 to display or not display such social network information may be determined dynamically based on whether or not such social network information is available in the database system.

Figure 7D:
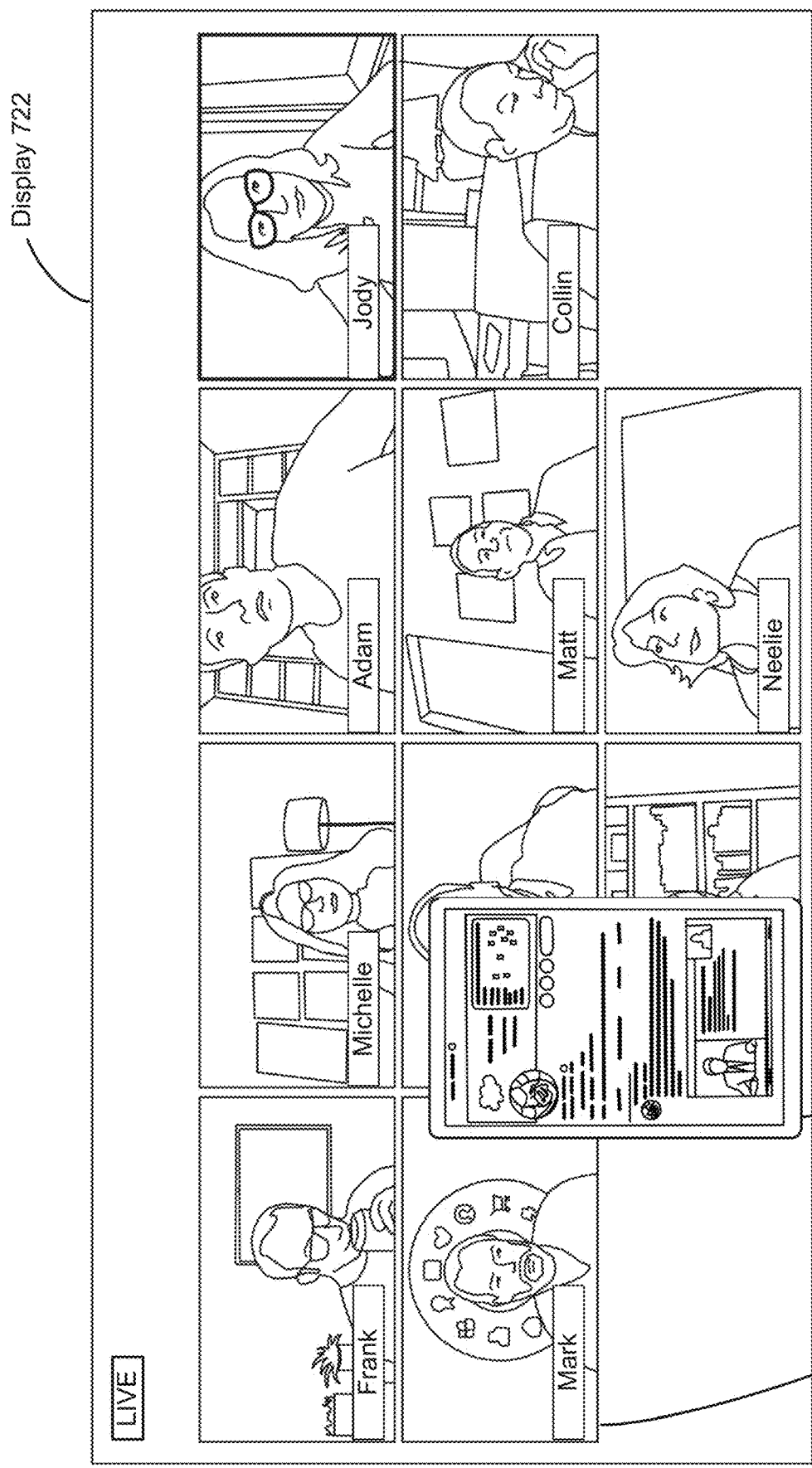

FIG. 7D illustrates a diagram of an example of a display associated with a video conferencing application, configured in accordance with some embodiments. As similarly discussed above, FIG. 7D illustrates a video conferencing application that may generate a display, such as display 722, which may include multiple windows, such as window 724, that are configured to display video streams for participants in a video conference session. As similarly discussed above, additional user interface element 726 may be generated and overlaid on top of display 722 to convey information retrieved from a computing platform. As shown in FIG. 7D, additional user interface element 728 may be configured to display a dynamically generated preview of social network information associated with the participant of window 724. In this example, social network information may have been retrieved from the database system, and may have been used by the computing platform to generate the preview displayed in additional user interface element 728. For example, the database system of the computing platform may have been queried to identify available social network information associated with the participant of window 724. Based on the results of the query, the computing platform may retrieve social network data from a social network page of the participant, and use that social network data to generate and send additional user interface element 728, which is subsequently displayed in display 722.

Figure 7E:
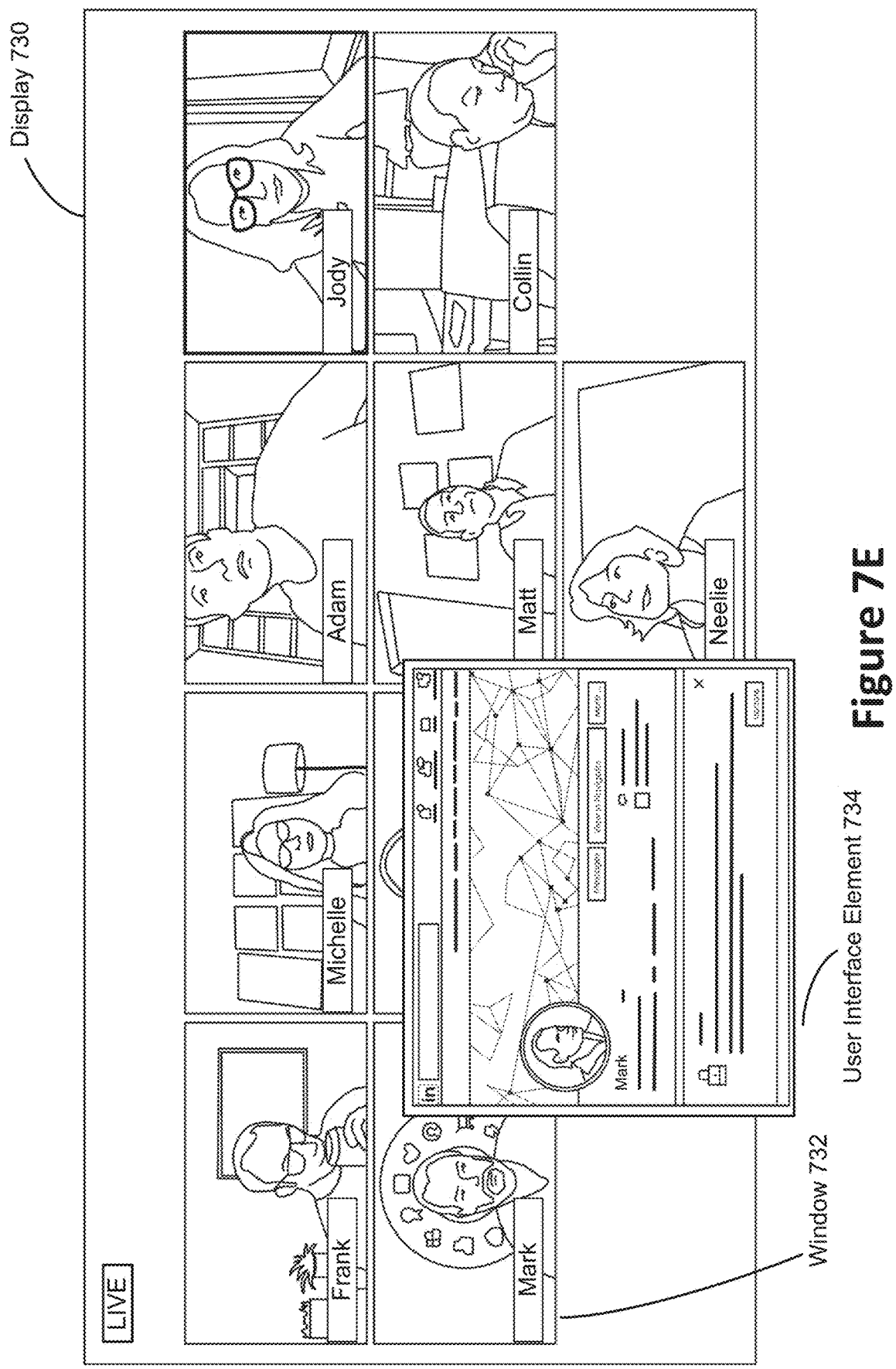

FIG. 7E illustrates a diagram of an example of a display associated with a video conferencing application, configured in accordance with some embodiments. As similarly discussed above, FIG. 7E illustrates a video conferencing application that may generate a display, such as display 730, which may include multiple windows, such as window 732, that are configured to display video streams for participants in a video conference session. As similarly discussed above, additional user interface element 734 may be generated and overlaid on top of display 730 to convey information retrieved from a computing platform. As shown in FIG. 7E, additional user interface element 734 may be configured to display a dynamically generated content representing social network information associated with the participant of window 732. As similarly discussed above, the social network information may have been retrieved from the database system, and may have been used by the computing platform to generate the contents of additional user interface element 734. In this example, additional user interface element 734 is configured to include various data fields that provide access to the elements of the social network page. For example, additional user interface element 734 is configured to include elements that enable features such as messaging, searching, and other operations via the social network itself. In this way, additional user interface element 734 may be configured as a portal to the social network page.

Figure 7F:
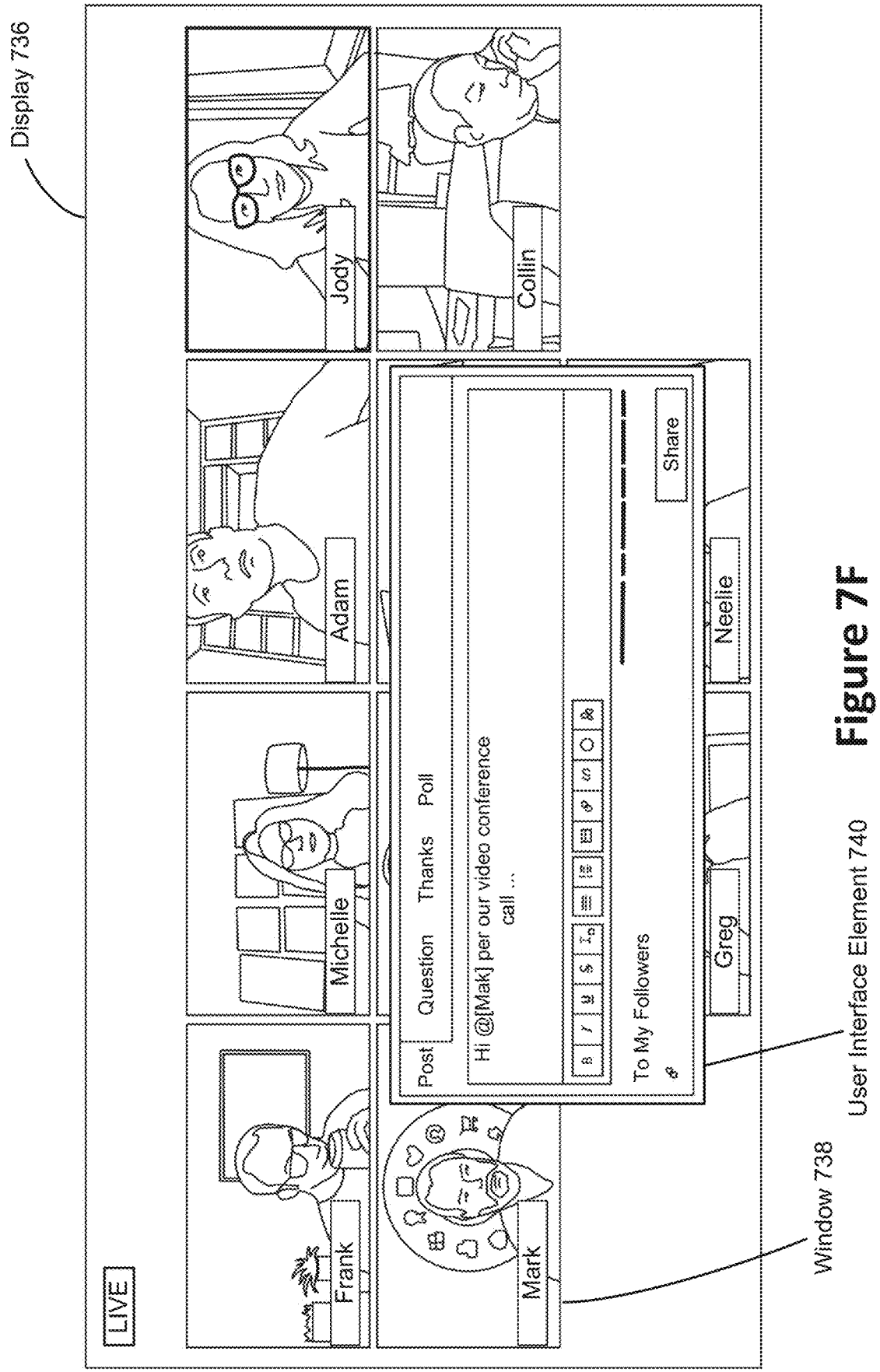

FIG. 7F illustrates a diagram of an example of a display associated with a video conferencing application, configured in accordance with some embodiments. As similarly discussed above, FIG. 7F illustrates a video conferencing application that may generate a display, such as display 736, which may include multiple windows, such as window 738, that are configured to display video streams for participants in a video conference session. As similarly discussed above, additional user interface element 740 may be generated and overlaid on top of display 736 to enable one or more features or functionalities that may be supported by a computing platform. As shown in FIG. 7F, additional user interface element 740 may be configured to include a messaging window that is configured to enable the generation and sending of a message via an application supported by the computing platform. In this way, user parameters associated with the participant of window 738 may be used to generate a messaging window capable of sending a message to the participant via the other application supported by the computing platform.

FIG. 7G illustrates a diagram of an example of a display associated with a video conferencing application, configured in accordance with some embodiments. As similarly discussed above, FIG. 7G illustrates a video conferencing application that may generate a display, such as display 742, which may include multiple windows, such as window 744, that are configured to display video streams for participants in a video conference session. As similarly discussed above, additional user interface element 746 may be generated and overlaid on top of display 742 to enable one or more features or functionalities that may be supported by a computing platform. As shown in FIG. 7G, additional user interface element 746 may be configured to include a set of functions that may correspond to actions supported by one or more applications hosted by the computing platform. Accordingly, additional user interface element 746 may be configured as a "control panel" in which several actions or functions may be made available to the user. For example, such actions may be the generation of a new email, the generation of a new note, as well as various other actions supported by the other application. In this way, additional user interface element 746 may provide a custom interface to one or more features of applications of the computing platform while a video conference session in taking place.

Figure 7H:
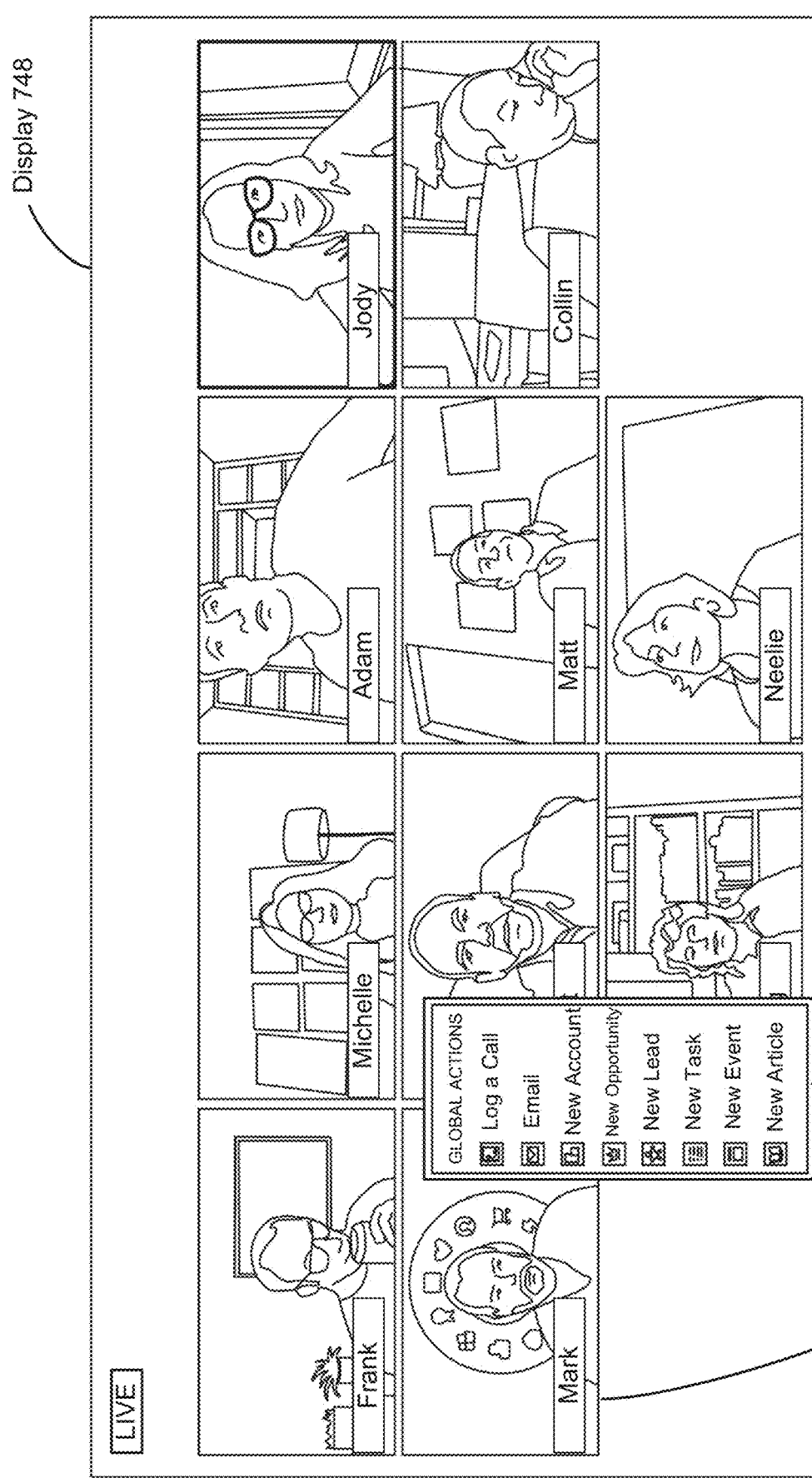

FIG. 7H illustrates a diagram of an example of a display associated with a video conferencing application, configured in accordance with some embodiments. As similarly discussed above, FIG. 7H illustrates a video conferencing application that may generate a display, such as display 748, which may include multiple windows, such as window 750, that are configured to display video streams for participants in a video conference session. As similarly discussed above, additional user interface element 752 may be generated and overlaid on top of display 748 to enable one or more features or functionalities that may be supported by a computing platform. As shown in FIG. 7H, additional user interface element 752 may be configured to include a set of functions that may correspond to actions supported by a particular application hosted by the computing platform. In one example, additional user interface element 746 may be configured to support several actions or functions that enable the generation, modification, and updating of CRM data stored in a database system of the computing platform. In this way, the user may be provided with such CRM data and the ability to modify, create, and update CRM data while a video conference session in taking place. It will be appreciated that while some actions and features are displayed, any suitable actions may be included in additional user interface element 752 as may be determined by the underlying application supported by the computing platform.

Figure 8:
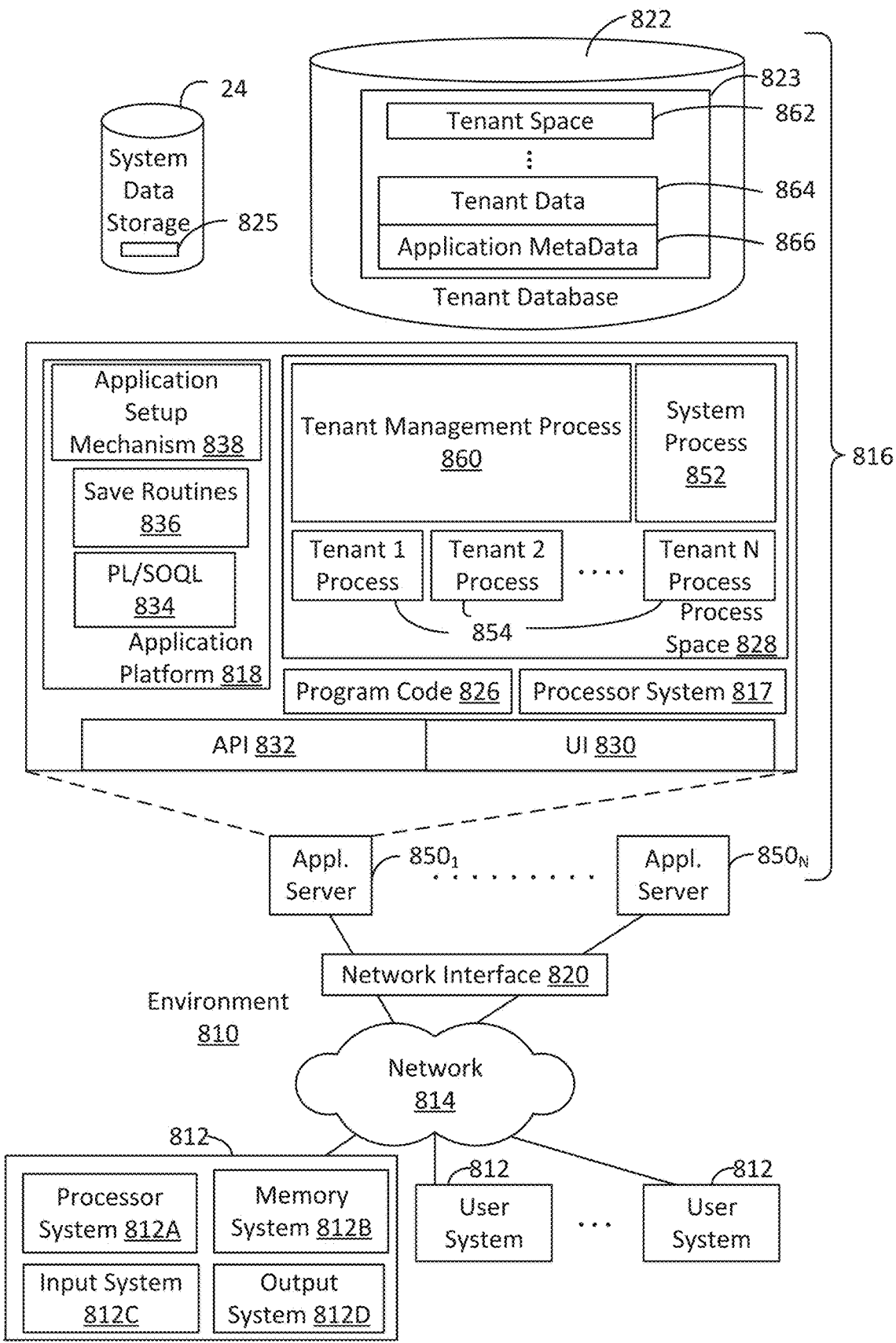
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 818 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based video conferencing system as well as a CRM management system. For example, in some implementations, system 816 may include application servers configured to implement and execute video conferencing software applications or CRM software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a video conferencing system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For video conferencing applications, such entities may be users and participants of video conference sessions. For CRM database applications, such standard entities might include tables for case, account, contact, lead, and opportunity data objects, each containing predefined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
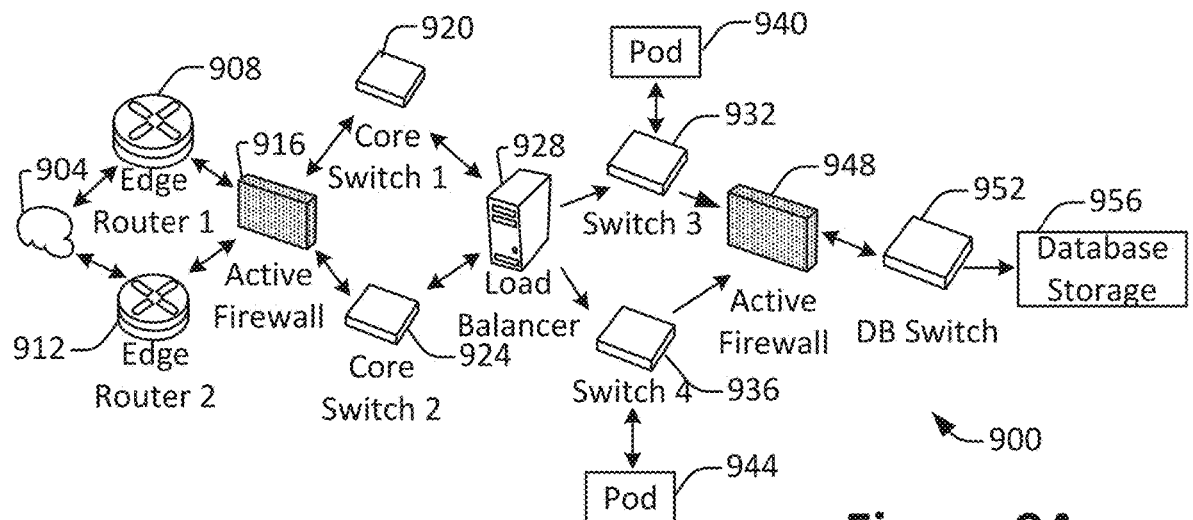
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process user and participant information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
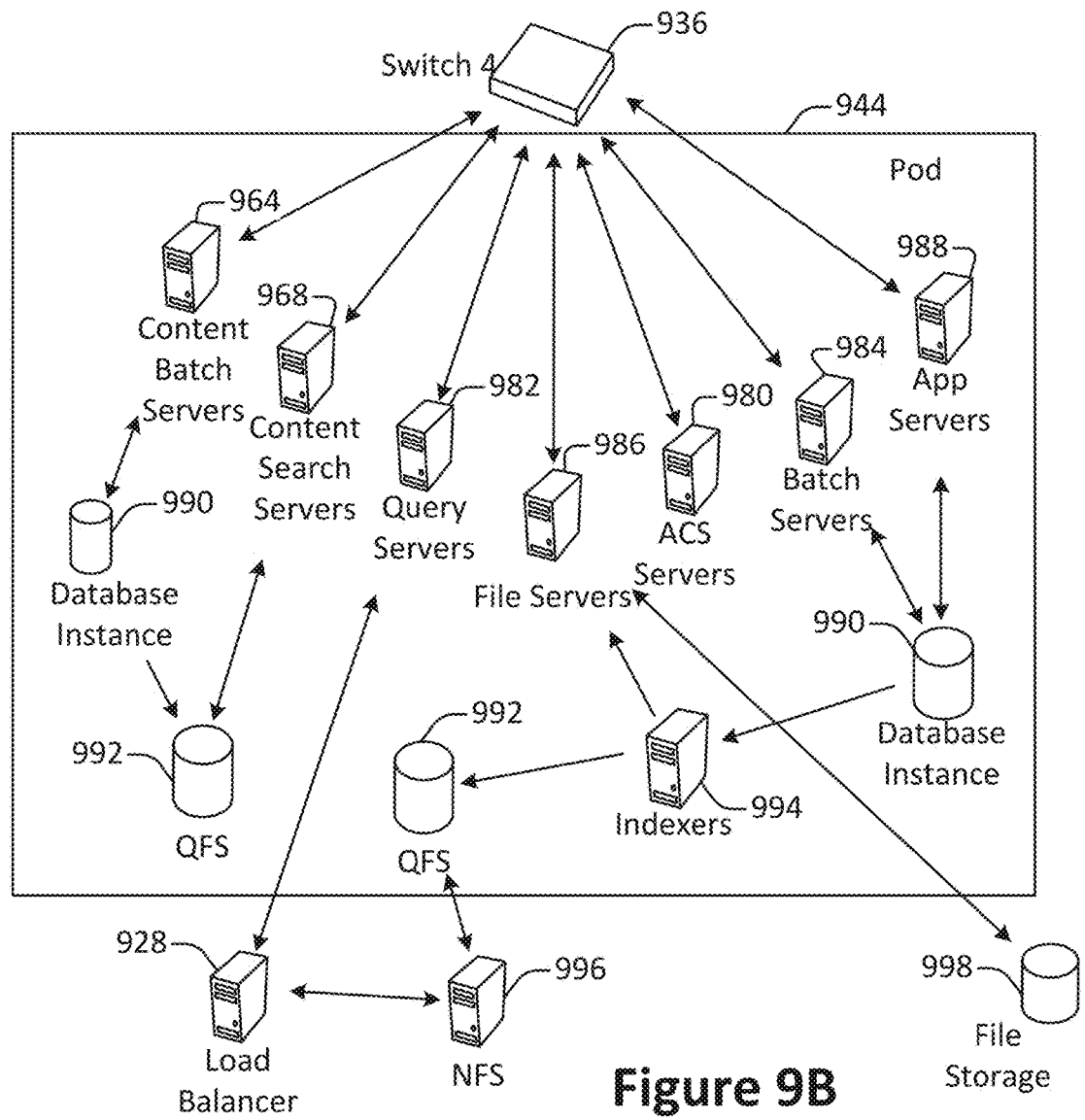
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBS), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
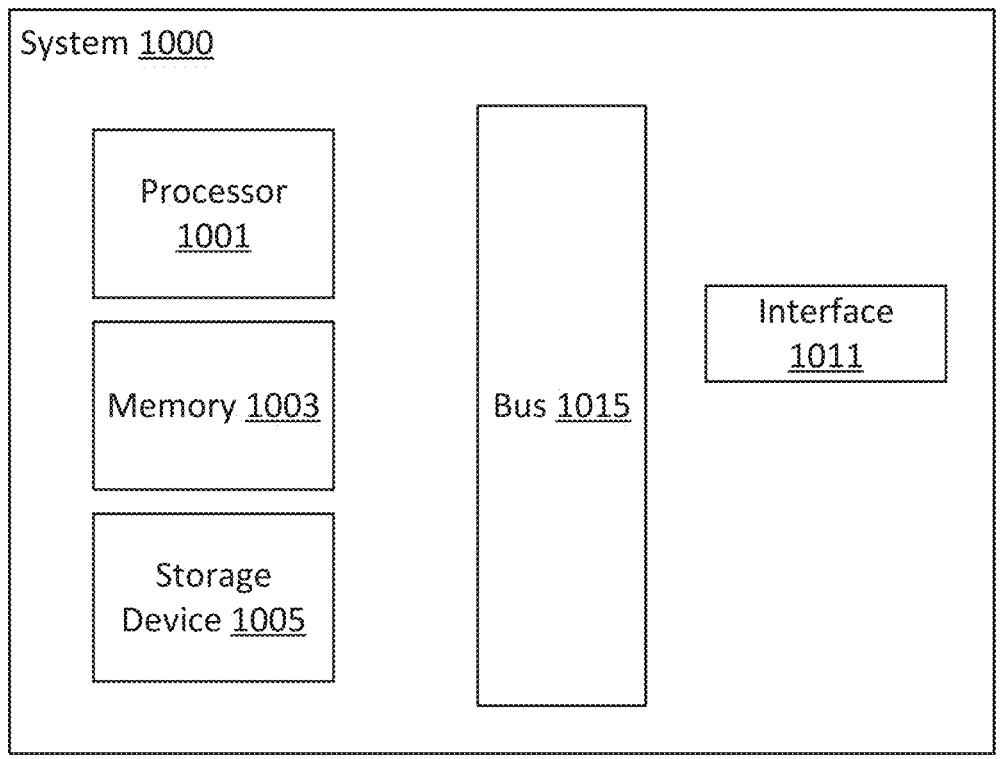
FIG. 10 illustrates one example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as a variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A computing platform implemented using a server system, the computing platform being configurable to cause:
   receiving, from a client device, a request from a video conferencing application while a video conference associated with the video conferencing application is in session, the request comprising an indication of a selection of one or more participants in a video conference session associated with the video conferencing application, wherein a user of the client device is a participant in the video conference session;
   implementing a query of a database system, the query being configured to retrieve user object data associated with at least one participant of the one or more participants, wherein the at least one participant is different from the user of the client device;
   generating a result object based, at least in part, on the retrieved one or more user data objects, the result object being configured to cause display, at a user interface of the video conferencing application, information about the at least one participant that is different from the user of the client device; and
   providing the result object to the client device to display, in the user interface of the video conferencing application, a graphical user interface (GUI) window including the information about the at least one participant, the GUI window further comprising a user interface element to provide access to at least one function associated with a computing platform.

2. The computing platform of claim 1, wherein the information comprises customer relationship management (CRM) data associated with an on-demand application of the computing platform.

3. The computing platform of claim 1, wherein the information comprises information from a social networking website associated with the at least one participant.

4. The computing platform of claim 1, wherein the at least one function is capable of performing messaging via the computing platform.

5. The computing platform of claim 1, wherein the at least one function is capable of generating a new data entry within the database system.

6. The computing platform of claim 1, wherein the at least one function is implemented in a window generated for the user interface of the video conferencing application via one or more function calls to the computing platform.

7. The computing platform of claim 6, wherein the one or more function calls are implemented during the video conference session such that the result object is integrated with the user interface of the video conference session.

8. The computing platform of claim 1, wherein the database system is a multi-tenant database system associated with an on-demand database service.

9. The computing platform of claim 1, wherein the providing of the GUI window comprises overlaying a video stream of the at least one participant with user data.

10. A method comprising:
    receiving, from a client device, a request from a video conferencing application while a video conference associated with the video conferencing application is in session, the request comprising an indication of a selection of one or more participants in a video conference session associated with the video conferencing application, wherein a user of the client device is a participant in the video conference session;
    implementing a query of a database system, the query being configured to retrieve user object data associated with at least one participant of the one or more participants, wherein the at least one participant is different from the user of the client device;
    generating a result object based, at least in part, on the retrieved one or more user data objects, the result object being configured to cause display, at a user interface of the video conferencing application, information about the at least one participant that is different from the user of the client device; and
    providing the result object to the client device to display, in the user interface of the video conferencing application, a graphical user interface (GUI) window including the information about the at least one participant, the GUI window further comprising a user interface element to provide access to at least one function associated with a computing platform.

11. The method of claim 10, wherein the information comprises customer relationship management (CRM) data associated with an on-demand application of the computing platform.

12. The method of claim 10, wherein the information comprises information from a social networking website associated with the at least one participant.

13. The method of claim 10, wherein the at least one function is capable of performing messaging via the computing platform.

14. The method of claim 10, wherein the at least one function is capable of generating a new data entry within the database system.

15. The method of claim 10, wherein the at least one function is implemented in a window generated for the user interface of the video conferencing application via one or more function calls to the computing platform.

16. The method of claim 15, wherein the one or more function calls are implemented during the video conference session such that the result object is integrated with the user interface of the video conference session.

17. The method of claim 10, wherein the providing of the GUI window comprises overlaying a video stream of the at least one participant with user data.

18. A computer program product comprising non-transitory computer-readable program code capable of being executed by one or more processors when retrieved from a non-transitory computer-readable medium, the program code comprising instructions configurable to cause the one or more processors to perform a method comprising receiving, from a client device, a request from a video conferencing application while a video conference associated with the video conferencing application is in session, the request comprising an indication of a selection of one or more participants in a video conference session associated with the video conferencing application, wherein a user of the client device is a participant in the video conference session;

implementing a query of a database system, the query being configured to retrieve user object data associated with at least one participant of the one or more participants, wherein the at least one participant is different from the user of the client device;

generating a result object based, at least in part, on the retrieved one or more user data objects, the result object being configured to cause display, at a user interface of the video conferencing application, information about the at least one participant that is different from the user of the client device; and providing the result object to the client device to display, in the user interface of the video conferencing application, a graphical user interface (GUI) window including the information about the at least one participant, the GUI window further comprising a user interface element to provide access to at least one function associated with a computing platform.

19. The computer program product recited in claim 18, wherein the at least one function is implemented in a window generated for the user interface of the video conferencing application via one or more function calls to the computing platform.

20. The computer program product recited in claim 19, wherein the one or more function calls are implemented during the video conference session such that the result object is integrated with the user interface of the video conference session.

* * * * *